Jan. 27, 1931.   V. MONROE ET AL   1,790,388
DRIVE CLAMP
Filed Dec. 5, 1929   2 Sheets-Sheet 1

Jan. 27, 1931.  V. MONROE ET AL  1,790,388
DRIVE CLAMP
Filed Dec. 5, 1929  2 Sheets-Sheet 2
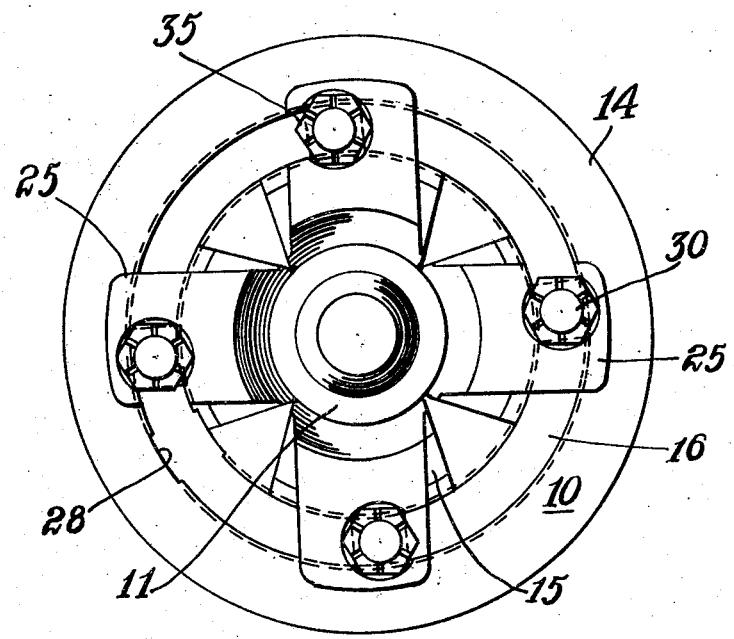
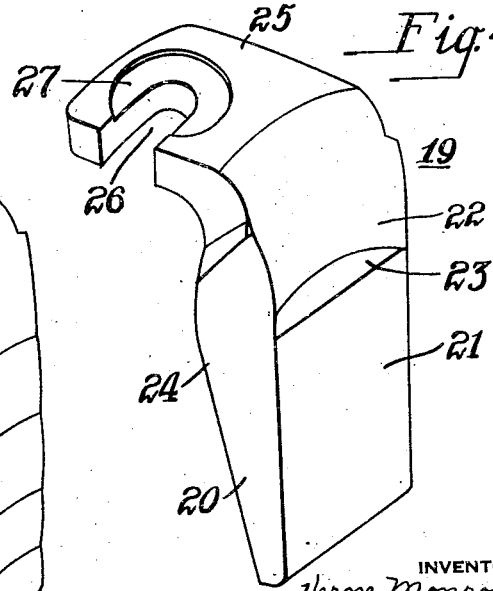
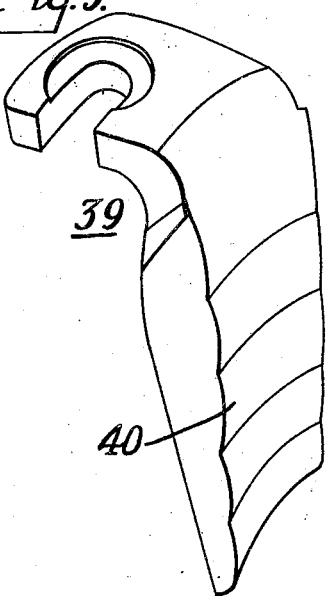
INVENTORS
Verne Monroe and
Roy L. Fletcher
By Green & McCallister
Their Attorneys Patented Jan. 27, 1931

1,790,388

UNITED STATES PATENT OFFICE

VERNE MONROE, OF CAMERON, WEST VIRGINIA, AND ROY L. FLETCHER, OF WASHINGTON, PENNSYLVANIA

DRIVE CLAMP

Application filed December 5, 1929. Serial No. 411,949.

This invention relates to drive clamps and especially those drive clamps which are used to drive casings and the like into well holes such as in the drilling of oil and gas wells.

It has been hitherto customary in the industry to use a drive clamp consisting of two metal rectangles which are bolted together by large bolts passing transversely through the ends of the separate rectangles, and in the abutting faces of the rectangles cut away portions cooperate to form a square hole which is adapted to receive the four square faces of a suitable stem or pin by means of which the drive clamp is suspended. In using such a drive clamp a spudding line is connected to the supply of cable or rope from which the drive clamp is suspended and the point of connection is adjacent the bull wheel so that reciprocatory motion can be given to the drive clamp in a vertical, or up and down direction, the weight of the drive clamp and the associated stem serving as a hammer to drive the casing into the well hole. This and similar structures are well known in the art and have a number of disadvantages which have hitherto been accepted as unavoidable.

Among the disadvantages and difficulties experienced in utilizing a device, such as above described, are the following: The drive clamp is difficult to put on and it cannot be used except on stems or pins specially formed for its reception; the sharp rectangular ends of the clamp portions catch on and cut spudding lines or other cables or ropes coming in contact therewith, and these sharp angles are, as is well known, inherently weak; the heavy bolts passing transversely through the rectangles are frequently broken and hence a heavy upkeep cost attaches to the use of the same, but an even greater disadvantage is inherent in the breaking of the bolts which is that accidents continually arise therefrom; heavy wrenches are necessary to install and keep the bolts and clamp in a tight assembly and there is a considerable loss of time in keeping the bolts tight; and one of the important disadvantages is the fact that the driving surface is rendered uneven resulting in an inefficient driving contact between the casing head and the clamp.

We have, therefore, designed a radically new type of drive clamp which has none of the disadvantages of the known type of clamp, as explained above, and which has additional advantages peculiar to its own construction.

The drive clamp of our invention provides a continuous internally tapered ring or base of great strength and it is known that a ring provides a construction of maximum strength. The construction of our new drive clamp permits it to be adjusted to different dimensions and it will grip and hold stems having either two or four plane faces or, indeed, it will securely grip a completely round stem or any other form of stem. There are no projections to catch on spudding or driving cables or other cables or ropes that might come in contact with the clamp. The clamp is not only easy to handle and easy to place in position, but it requires, at most, only a very small wrench to tighten up the assembly, as will be hereinafter understood, and the assembled structure is practically indestructible. In addition, it has proved in practice to be highly successful and 100% safe and an even driving surface is ensured at all times for obtaining a proper directional driving blow. These and many other advantages will be apparent to those skilled in this particular art.

A preferred construction of our new type of driving clamp is illustrated in the accompanying drawings, wherein similar numerals refer to similar parts throughout the several views, and wherein:

Figure 1 is an elevational view of the assembled drive clamp and stem in operative position suspended from a cable and cable socket.

Fig. 2 is a vertical section through the drive clamp and the upper portion of the stem showing the same in operative assembly.

Fig. 3 is a plan view of Fig. 2.

Fig. 4 is a perspective view of one form of slip used in the drive clamp, and

Fig. 5 is a perspective view of a modified form of slip.

Referring now to the drawings in detail, the partial assembly of Fig. 1 shows the drive clamp 10 of the present invention in operative position on a stem 11. The upper end of the stem is shown connected to a cable or rope socket 12 at the top of which the lower end of the cable or rope 13 is attached in known manner. As is well known, the cable passes up through the derrick and over a pulley or guide wheel at the top thereof from which it descends and passes onto a bull wheel where the supply of cable is maintained.

The drive clamp consists of a heavy solid metallic ring 14 having a central tapered aperture 15 and in the upper surface of the ring is an annular groove 16 having an enlarged and undercut portion 17, as shown, for a purpose which will be apparent hereinafter. The ring is provided on its outer surface with a number of relatively small and comparatively shallow depressions 18 by means of which the clamp can be lifted or carried by the use of a suitable tong device, as the ring is of considerable weight, and is preferably made of forged steel or any other strong and heavy metal or alloy thereof.

A plurality of metallic slips 19 are inserted vertically and distributed circumferentially in the central tapering aperture 15 of the ring 14. These slips are of general wedge shape and are arcuate at the same time so as to closely fit into and cooperate with the ring in its central aperture and to form therewith a strong and efficient assembly. In a preferred case the slips are all of the same type and hence a description of one will suffice for all, except as hereinafter noted.

Referring, therefore, specifically to Fig. 4, each slip 19 has a wedge-shaped body portion 20 tapering toward its lower end. The inner face 21 which fits against the flat face of the stem, as will be explained more fully hereinafter, is a plane surface, but the upper portion 22 is cut away so as to leave an intermediate shoulder 23 the purpose of which will be disclosed. The outer surface 24 of the slip is convex and arcuate so as to cooperate perfectly with the tapered surface of the ring. The top of the slip is provided with an angular integral ear 25 which has extending partially laterally therethrough a countersunk slot 26, the countersunk surface 27 being adapted to receive the base of a spring in the assembled device. The lateral countersunk slot is preferably formed by cutting a circular hole in the ear 25, the center of the hole being slightly offset with respect to the central medial line of the ear itself. The slot is then completed by extending one side of the hole to the side of the ear thus forming what may be termed a semi-elliptical slot. The countersunk surface is generally circular in form, as shown, to receive the base of a circular spring. The other characteristics of form and shape of the slip will be readily apparent from Fig. 4.

As all the slips are assembled in operative relation with the ring and stem in the same way, it will only be necessary to describe one such assembly, thereby preventing undue repetition. From Figs. 2 and 3, it will be observed that the annular undercut groove 16 has an enlargement 28 at one point thereof. The purpose of this is to permit the insertion of the enlarged base 29 of a bolt shank 30, the inner and outer surfaces of the enlarged base being arcuate to correspond to the inner and outer arcuate circumferences of the slot, and the other two surfaces of the enlarged base being plane. A bolt is thus inserted in the groove and moved to a suitable position in the groove and, a stem 11 having been meanwhile centrally held in relation to the ring with one of its flat faces 31 opposite the position of the inserted bolt, a slip 19 is placed against the tapering surface of the ring so that the shoulder 23 of the slip abuts just below and against the shoulder 32 formed by the joining of the flat face and the round portion of the stem.

It is understood that the other three slips and bolts are now assembled into position. The shank of each bolt is inserted into the semi-elliptical slot in the ear of each slip. A spring 33 is provided around the upper portion of the shank which is threaded at 34 to receive a castellated nut 35, the lower surface of the nut having a short collar 36 so that the top of the spring will engage the same and provide an adjustably tensionable connection whereby when the nut is turned down, compressing the spring, a firm assembly will be made and due to the sizes of the same, it will be obvious that a tight assembly can be made by the use of a very small wrench, not shown, or even by the fingers of the operator. The top of the bolt shank 30 has a small transverse aperture 37 for the reception of a cotter pin (not shown) or other locking element.

In this manner, the four slips are tightened into position so that the stem 11 is securely positioned therebetween and engaged thereby. The upper end of the stem has a tapered exteriorly threaded projection or extension 38 for suitable connection to a rope or cable socket, as already explained.

In operation, the ring is reciprocated vertically, or up and down, as already explained, and the lower surface of the ring forms an exceedingly accurate and efficient hammer to drive the casing into the well hole, the projecting lower end of the stem acting as a guide to maintain the casing in a straight position. The construction of the casing or the provision thereon of a casing drive head at the top thereof to receive the driving blows from the drive clamp is well known and forms no part of the present invention.

The form of the invention discussed above is adapted to be used where the stem to be engaged is provided with four flat faces. It sometimes happens, however, that the available stem has only two opposite flat faces, the other faces being round and of the original contour of the stem. Our invention can, however, be adapted to engage such a stem and in that connection attention is directed to Fig. 5. Two opposite slips of the type of Fig. 4 are used in the manner and form aforesaid to cooperate with the two flat opposite surfaces of the stem to be engaged therebetween, but it will be clear that the other two opposite faces being convex will not cooperate with slips of the type shown in Fig. 4. For this purpose, we have provided a modified form of slip 39 wherein the inner face 40 is concave and corrugated so as frictionally to engage the convex faces of the stem. Otherwise, these modified slips are exactly the same as the previously mentioned slips and they are assembled and adjusted and used in precisely the same manner.

In setting or starting the first one or two joints of drive pipe, and before any hole is made ahead, due to the relative lengths of the parts involved, the drive clamp is secured lower down on the round part of the stem and in such circumstances four slips of the type 39 of Fig. 5 may be used. The assembly and operation is believed to be clear from the foregoing without the necessity for a detailed consideration. When the hole is sufficiently deep to accommodate the stem, the drive clamp is raised to the position shown in Fig. 1 and the proper slips again used depending on the number of flat faces provided.

We have thus provided a drive clamp of exceedingly compact and convenient nature and which is adaptable to the usual type of stem having four flat faces, but which is also just as practicable and efficient with the types of stem which have only two opposite flat faces or which have no flat faces at all. The invention is equally practicable under all these conditions of use and installations have proved their immediate success as they have been enthusiastically received in the industry in which, so far as we are aware, no improvements have been made in drive clamps, but the old and original types have been hitherto used exclusively. This invention both in theory and in use has justified all the advantages claimed for it and has filled a long-felt want most effectively.

The above is intended to be substantially illustrative and we do not limit ourselves to the precise details disclosed as it will be apparent that further modifications and variations can be made without departing from the spirit and scope of the invention. The material from which the rings, slips, bolts, nuts and stems are made are preferably strong heavy forgings of steel or other suitable metals or alloys thereof. The size, shape and proportions are naturally somewhat variable to meet all conditions found in the industry and it is clear that the contours and sizes of the various parts are comformable to the circumstances met.

What we claim as new and wish to secure by Letters Patent is:

1. A drive clamp including a base, having a central aperture and an annular groove in its upper surface, slips extending into said central aperture to engage a stem therebetween, and means associated with said groove for securing said slips in said position.

2. A drive clamp including a circular base, having a central aperture and an annular groove in its upper surface, wedge-shaped slips extending into the central aperture to engage a stem therebetween, said slips having angular ears, and means connecting said groove and ears to secure said slips in position.

3. A drive clamp including a solid circular base, having a central aperture and an annular groove in its upper surface, wedge-shaped slips extending substantially vertically downwardly around the circumference of the aperture, to engage a stem therebetween, said slips having slotted angular ears, and means in said groove and slots to secure said slips in position.

4. A drive clamp including a heavy solid circular base, having an annular groove in its upper surface and a central tapering aperture, wedge-shaped slips disposed circumferentially in said aperture to engage a stem therebetween, said slips having slotted ears extending substantially at right angles to their tops, and means in and connecting said groove and slots to secure said slips in position.

5. A drive clamp including a heavy solid metallic circular base, having an annular undercut groove in its upper surface and a central tapering circular aperture, a plurality of wedge-shaped metallic slips disposed in said aperture and each having a recess to cooperate with a shoulder in a stem, thereby engaging said stem therebetween, said slips having outwardly extending slotted ears, and bolts seated in said groove and said slots for securing said slips in position.

6. In a circular drive clamp having a central tapering aperture and an annular undercut groove in its upper surface, a wedge-shaped slip in said aperture having a recess in its inner face and an outwardly extending slotted ear, a bolt having an enlarged base in said groove, the shank of the bolt extending up through the slot in the ear, a spring surrounding the upper part of the shank and larger in circumference than the width of the slot, and a nut on the upper end of the shank.

7. In a circular drive clamp having a central tapering aperture and an annular undercut groove in its upper surface, a wedge-shaped slip in said aperture having a recess in its inner face and an angularly extending slotted ear, a bolt having an enlarged base in said groove, the shank of the bolt extending up through the slot in the ear, a spring surrounding the upper part of the shank and larger in circumference than the width of the slot, and a nut on the upper end of the shank, said slot being countersunk and said groove having an enlargement for inserting and removing said bolt.

8. In a circular drive clamp having a central tapering aperture and an annular undercut groove in its upper surface, a wedge-shaped slip in said aperture having a recess in its inner face and an outwardly extending slotted ear, a bolt having an enlarged base in said groove, the shank of the bolt extending up through the slot in the ear, a spring surrounding the upper part of the shank and larger in circumference than the width of the slot, and a nut on the upper end of the shank, said slot being countersunk and said groove having an enlargement for inserting and removing said bolt, the nut being castellated and the shank having a transverse hole therethrough near its upper end.

9. In a drive clamp, a slip comprising a tapered body portion having a plane inner surface and a convex outer surface, the upper portion of said inner face being cut away to provide a shoulder, and an ear extending substantially at right angles to the body portion and having a countersunk slot therein.

10. In a drive clamp, a slip comprising a vertical tapered body portion and a horizontal integral ear, said body portion having an outer convex face and an inner plane face, the upper part of which is cut away to provide an intermediate shoulder, and said ear having a countersunk slot of semi-elliptical shape extending laterally thereinto.

11. In a drive clamp, a slip having a vertical wedge-shaped body portion and a horizontal integral ear, said body portion having an outer convex surface and an inner concave corrugated surface, and said ear having a countersunk slot of semi-elliptical shape extending laterally thereinto.

12. A drive clamp including a heavy solid circular base, having an annular groove in its upper surface and a central tapering aperture, wedge-shaped slips disposed circumferentially in said aperture to engage a stem therebetween, said slips having slotted ears extending substantially at right angles at their tops, and means in and connecting said groove and slots to secure said slips in position, adjacent slips being similarly contoured.

13. A drive clamp including a heavy solid circular base, having an annular groove in its upper surface and a central tapering aperture, wedge-shaped slips disposed circumferentially in said aperture to engage a stem therebetween, said slips having slotted ears extending substantially at right angles at their tops, and means in and connecting said groove and slots to secure said slips in position, adjacent slips being dissimilarly contoured.

14. A drive clamp including a heavy solid circular base, having an annular groove in its upper surface and a central tapering aperture, wedge-shaped slips disposed circumferentially in said aperture to engage a stem therebetween, said slips having slotted ears extending substantially at right angles at their tops, and means in and connecting said groove and slots to secure said slips in position, opposite slips being similarly contoured.

15. A drive clamp including a heavy solid circular base, having an annular groove in its upper surface and a central tapering aperture, wedge-shaped slips disposed circumferentially in said aperture to engage a stem therebetween, said slips having slotted ears extending substantially at right angles at their tops, and means in and connecting said groove and slots to secure said slips in position, said slips including opposite plano-convex and intermediate concavo-convex corrugated slips.

16. A drive clamp including a heavy solid circular base, having an annular groove in its upper surface and a central tapering aperture, wedge-shaped slips disposed circumferentially in said aperture to engage a stem therebetween, said slips having slotted ears extending substantially at right angles at their tops, and means in and connecting said grooves and slots to secure said slips in position, all of said slips being plano-convex and provided with an intermediate shoulder on the plane side thereof.

17. A drive clamp including a heavy solid circular base, having an annular groove in its upper surface and a central tapering aperture, wedge-shaped slips disposed circumferentially in said aperture to engage a stem therebetween, said slips having slotted ears extending substantially at right angles at their tops, and means in and connecting said groove and slots to secure said slips in position, all of said slips being concavo-convex corrugated slips.

18. In a drive clamp, a base member having a central tapered aperture, an undercut groove in its upper surface, and depressions in its outer surface.

19. In a drive clamp, a circular base member having a central tapered aperture, an undercut annular groove in its upper surface and depressions spaced circumferentially in its outer surface.

20. In a drive clamp, a circular base member having a central tapered aperture, an annular groove in its upper surface which has an enlarged undercut extension, and relatively shallow depressions spaced circumferentially in its outer surface.

In testimony whereof, we have hereunto set our names this 3rd day of December, 1929.

VERNE MONROE.
ROY L. FLETCHER.